United States Patent
Stevenson et al.

[11] 3,721,842
[45] March 20, 1973

[54] MOVING COIL LINEAR MOTORS

[75] Inventors: Timothy John Stevenson, Windsor; Raymond Yardy, Yateley, near Camberley, both of England

[73] Assignee: International Computers Limited, London, England

[22] Filed: March 9, 1972

[21] Appl. No.: 233,049

[30] Foreign Application Priority Data

March 18, 1971 Great Britain..................07,157/71

[52] U.S. Cl.............................................310/13, 310/27
[51] Int. Cl.............................................H02k 41/02
[58] Field of Search.........................310/12–14, 27; 179/115.5, 119, 120

[56] References Cited

UNITED STATES PATENTS

| 3,505,544 | 4/1970 | Helms | 310/13 |
| 3,619,673 | 11/1971 | Helms | 310/13 |

FOREIGN PATENTS OR APPLICATIONS

| 789,725 | 1/1958 | Great Britain | 310/27 |
| 1,390,231 | 1/1965 | France | 310/27 |
| 885,025 | 12/1961 | Great Britain | 310/27 |

OTHER PUBLICATIONS

"Magnetizing Coil Arrangement for Linear Actuator," IBM Tech. Disclosure Bulletin, Hu, p. 1803, Vol. 12, No. 11, 4/70

Primary Examiner—D. F. Duggan
Attorney—Hane, Baxley and Spiecens

[57] ABSTRACT

A linear motor is described consisting of a central pole piece disposed within a cylindrical pot magnet, the pot magnet having an end plate containing a central aperture into which the central pole piece projects to form an air gap. A magnet shield in the form of a tube is positioned coaxially with and spaced from the central pole piece and a coil is mounted for linear movement in a direction parallel to the axis of the pole piece in the air gap and in the space between the pole piece and the surrounding shield.

6 Claims, 1 Drawing Figure

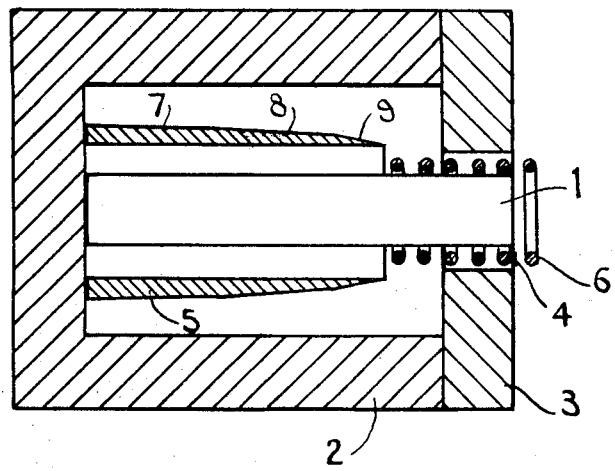

MOVING COIL LINEAR MOTORS

BACKGROUND OF THE INVENTION

This invention relates to linear motors.

Linear motors operating on the principle of the moving coil loudspeaker, that is, utilizing the thrust produced by the passage of an electric current through a coil which is mounted in the gap of a magnetic system, are well known. One use of such motors is for the positioning of magnetic read/write heads on the discs of a magnetic disc data storage system.

The construction of a linear motor suitable for use in a disc storage system is shown in U.S. Pat. No. 3,260,870. The design of such motors presents special problems because of the relatively long stroke, the need for the best possible efficiency to provide short operating times, and the control of the position of the coil by a servo system. These requirements entail using the maximum possible flux density in the gap and at the same time achieving a flux distribution which provides a high degree of linearity for the coil thrust.

SUMMARY OF THE INVENTION

According to the invention a linear motor includes a closed magnetic system formed by a central pole piece and a surrounding shell and with an air gap between the central pole piece and the shell; a magnetic shield within the shell spaced from the central pole piece and so formed that it shields the central pole piece from leakage magnetic flux and is maintained close to, or at, magnetic saturation thereby; and a coil mounted for linear movement within the air gap and the space between the shield and the central pole piece.

BRIEF DESCRIPTION OF THE DRAWING

The invention will now be described, by way of example, with reference to the accompanying drawing which shows a cross-sectional view of a linear motor in schematic form.

DESCRIPTION OF THE PREFERRED EMBODIMENT

The magnet system consists of a central pole piece 1 which is secured inside a cylindrical pot magnet 2. A closed system is formed by a magnetic front plate 3, which has a central hole so that an air gap 4 is formed between the pole piece 1 and the plate 3.

A magnetic shield tube 5 is mounted coaxially with and spaced from the central pole piece 1. A coil 6 is mounted so that it is free to move parallel to the axis of the pole piece 1 in the air gap 4 and the space between the pole piece and the surrounding shield 5. The application of a current to the coil 6 produces a magnetic field which interacts with the magnetic field in the air gaps to cause the coil to move linearly.

The construction of the motor described above is similar to that described in U.S. Pat. No. 3,260,870, with the exception of the magnetic shield 5. It will be understood that the magnet system may be arranged in other ways. For example, one or more ring magnets may be secured between back and front plates of soft magnetic material. Alternatively, the whole structure may be of soft magnetic material, the required magnetic field being generated by suitable coils wound around one or more of the magnetic members of the magnet system.

In order to understand the function performed by the shield 5, it is convenient to consider first the operation of a system without a shield. As has been noted above, it is desirable to use the maximum possible flux density in the air gap. At the same time, the dimensions of the central pole piece 1 are limited by mechanical considerations of the design of the coil 6. Consequently, the central pole piece is normally operated in a substantially magnetically saturated condition.

Although the system is designed to concentrate the major part of the total flux across the air gap, there is inevitably some leakage flux between the inside of the shell, that is, the parts 2 and 3, and the pole piece 1. This leakage flux will be distributed along the length of the pole piece 1, so that the maximum flux density in the pole piece 1 occurs at the rear end where it abuts the part 2. However, the pole piece is in a magnetically saturated condition, so that the total flux in the air gap is approximately the ideal gap flux less the leakage flux.

Secondly, the variation of flux along the length of the pole piece 1 will cause the force exerted on the coil to vary for a constant current flowing through the coil. The coil current is usually controlled by a servo system so that magnetic heads attached to an extension of the coil may be positioned accurately. Any non-linearity in the relationship between the current flowing in the coil and the resulting force on it is likely to result in a degradation of the performance of the servo-loop.

The introduction of the shield 5 of soft magnetic material causes the leakage flux to return through the shield instead of through the center pole, provided that the leakage flux does not tend to produce a flux density exceeding the saturation flux density of the shield. Hence, the introduction of the shield largely overcomes the problems of reduction in the flux in the gap 4 and the non-uniformity of the field along the pole piece. However, the shield can itself introduce a problem if it is not properly designed. As in the case of the center pole piece, the maximum flux in the shield will occur at the end remote from the front plate. If the shield has a uniform magnetic cross-section, the end of the shield adjacent to the front plate must be unsaturated and it therefore provides an alternative path for flux between the center pole and the front plate. A substantial proportion of the gap flux can be diverted to this alternative path when the coil is energized, reducing the effective gap flux. This difficulty can be overcome by ensuring that the shield is close to, or at, magnetic saturation at all points due to the leakage flux. This can be achieved by suitable shaping of the shield. A satisfactory approximation in one example has been found to be three conical sections, indicated at 7, 8 and 9 in the drawing.

In calculating the dimensions of the shield, if the front plate 3 is magnetically saturated at the gap region then the shield must be spaced sufficiently far from the front plate to ensure that at any point of the front plate the sum of the flux passing to the gap and the leakage flux to the shield does not exceed the saturation flux density of the front plate. If the front plate is not saturated in the gap region, the minimum separation of the shield and the front plate is determined by the maximum acceptable value of fringing field in the region surrounding the gap. Having determined the length of the shield, the shape of the shield to provide substantially a condition of magnetic saturation throughout its length may be determined by calculating the distribution of the leakage flux inside the shell. In practice, it may be more convenient to estimate the distribution by simple approximation and to refine the results by test and experiment.

It will be appreciated that the requirement for saturation of the shield may be achieved wholly, or in part, by varying the magnetic characteristics of the shield along its length, for example, using two or more materials with different saturation flux densities or using a material which has been processed, say by heat treatment, to provide a non-uniform saturation flux density.

It will also be realized that the linear motor need not be constructed in the form of a pot magnet as described in the embodiment but may, for example, be in the form of a U-shaped member with a central pole piece. It is common in such structures to attach pole pieces to the ends of the arms to define air gaps between these pole pieces and the central pole piece.

We claim:

1. A linear motor including a central pole piece; a surrounding shell disposed relative to the central pole piece to form a closed magnetic circuit incorporating an air gap between the central pole piece and the shell; a magnetic shield disposed between the central pole piece and the shell, the shield being spaced from the central pole piece to shield the central pole piece from leakage magnetic flux and being maintained close to, or at, magnetic saturation thereby; and a coil loosely formed about the central pole piece to permit linear movement of the coil in a direction parallel to said central pole piece within the air gap and the space between the shield and the central pole piece.

2. A linear motor as claimed in claim 1 in which said magnetic shield has different parts with different magnetic saturation characteristics respectively.

3. A linear motor as claimed in claim 2 in which said magnetic shield parts are respectively of different thicknesses.

4. A linear motor as claimed in claim 2 in which said magnetic shield parts are respectively constructed from two or more different materials, the materials having different magnetic saturation characteristics respectively.

5. A linear motor as claimed in claim 1 in which the surrounding shell includes portions substantially parallel to said central pole piece; and plates abutting said portions and extending towards said pole piece, said air gap being provided between the plates and the pole piece; the relative dimensions and dispositions of the shield and the plates being such that the shield is spaced sufficiently far from said plates to ensure that at any point on the plates the sum of the magnetic flux passing to the air gap and the leakage flux to the shield does not exceed the saturation flux density of the plates.

6. A linear motor as claimed in claim 5 including a pot magnet having an open end and sides formed by a continuous wall and in which said continuous wall forms said portions; and further including a single annular member abutting the wall at said open end, respectively radially opposite parts of said annular member corresponding to said plates; the central pole piece being arranged substantially coaxially in the pot magnet and extending into the central aperture of the annular member.

* * * * *